US007570863B2

(12) United States Patent
Noseda et al.

(10) Patent No.: US 7,570,863 B2
(45) Date of Patent: Aug. 4, 2009

(54) CABLE STORAGE DEVICE AND METHOD FOR HANDLING CABLE ENDS

(75) Inventors: Iso Noseda, Nottwil (CH); Zane Meredith, Root (CH)

(73) Assignee: Komax Holding AG, Dierikon (CH)

( * ) Notice: Subject to any disclaimer, the term of this patent is extended or adjusted under 35 U.S.C. 154(b) by 816 days.

(21) Appl. No.: 11/262,958

(22) Filed: Nov. 1, 2005

(65) Prior Publication Data

US 2006/0107522 A1 May 25, 2006

(30) Foreign Application Priority Data

Nov. 2, 2004 (EP) ................................ 04405669

(51) Int. Cl.

*G02B 6/00* (2006.01)
*B65G 1/00* (2006.01)
*B65D 21/00* (2006.01)
*F16L 3/08* (2006.01)

(52) U.S. Cl. ....................... 385/137; 385/134; 385/135; 385/136; 206/499; 29/745; 29/748; 29/868; 248/49; 248/68.1; 414/331.01

(58) Field of Classification Search ......... 385/134–137; 248/49, 65, 68.1, 74.1; 206/499; 29/728–729, 29/742, 745, 748, 759, 868; 414/331.01, 414/331.08

See application file for complete search history.

(56) References Cited

U.S. PATENT DOCUMENTS

| | | | | |
|---|---|---|---|---|
| 4,877,228 | A | 10/1989 | Ripert et al. | |
| 5,127,159 | A | 7/1992 | Kudo et al. | |
| 5,606,795 | A | 3/1997 | Ohba et al. | |
| 6,042,323 | A * | 3/2000 | Cervantes et al. | 414/331.08 |
| 6,215,942 | B1 * | 4/2001 | DeMeritt et al. | 385/136 |
| 7,024,760 | B2 * | 4/2006 | Soriano | 29/742 |
| 7,215,867 | B2 * | 5/2007 | Noseda et al. | 385/137 |

FOREIGN PATENT DOCUMENTS

| | | |
|---|---|---|
| EP | 0 494 570 | 7/1992 |
| EP | 0 584 493 | 10/1996 |

* cited by examiner

*Primary Examiner*—Frank G Font
*Assistant Examiner*—Michael P Mooney
(74) *Attorney, Agent, or Firm*—Venable LLP; Ralph P. Albrecht; Ryan M. Flandro

(57) ABSTRACT

In order to make possible simple operation of a cable storage device it is proposed that a multitude of cable storage elements be arranged on a rail and comprise an element with which they can be displaced by the cable gripper in a front delivery row until they are collected, preferably manually, for further treatment.

9 Claims, 5 Drawing Sheets

CABLE STORAGE DEVICE AND METHOD FOR HANDLING CABLE ENDS

Figure 1:
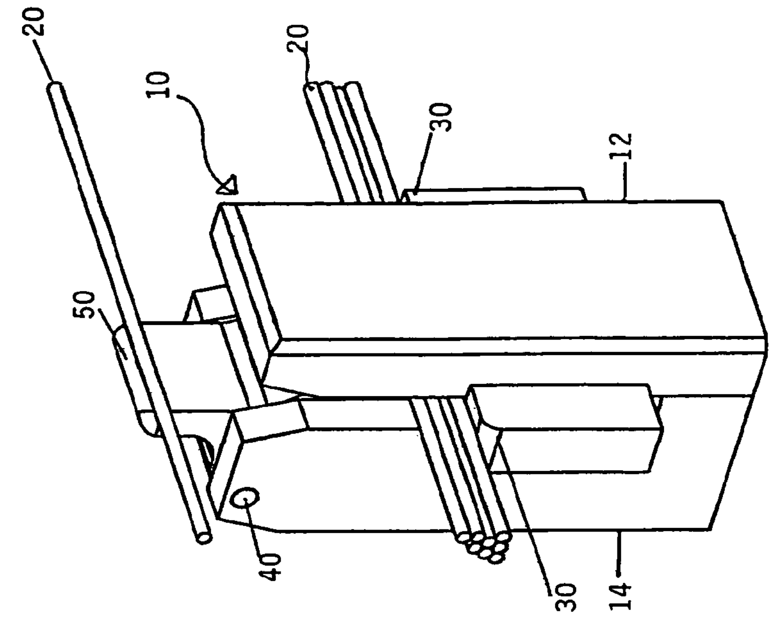

The present invention relates to a device for the storage of cables or cable sections at their ends. In particular the invention relates to such a device for storage in a device in which the cables can not only be transported, but can also easily and practically be conveyed to the process involving further treatment. Furthermore, the invention relates to a method for handling cables in a storage device, in particular in conjunction with the above-mentioned device.

From U.S. Pat. No. 5,127,159 (e.g. particularly well shown in FIG. 2B thereof), a cable storage device comprising clamping devices arranged side-by-side is known, into which clamping devices the cable ends are to be clamped. However, the cable ends are clamped into the clamping devices such that said cable ends are subjected to quite considerable transverse and longitudinal loads. Furthermore, the cables have to be pulled out; a process which again results in considerable loads on the cable ends, or a special device is required so as to release the cable ends in a way that only involves exposure to light loads.

Furthermore, the cable storage device known from U.S. Pat. No. 5,127,159 is associated with a disadvantage in that a multitude of cable ends can be stored in the same clamping position only while the cable ends are subjected to yet greater loads.

The operation of a cable storage device as described above is known in principle from U.S. Pat. No. 5,606,795, without, however, the above-mentioned problems having been solved therein.

A gripping device for treating cable ends is also known from EP-A-0 494 570 as well as from EP-A-0 584 493.

Known in principle are revolving storage devices, so-called turret storage devices, in which the cable ends typically are arranged circumferentially. Such storage units are particularly well suited to programmed automatic further treatment. However, such turret arrangements are less well suited to manual further treatment.

It is thus the object of the invention to propose a device with which cable storage devices can be easily supplied with cables or cable ends, and which device supports manual further treatment to a particular extent. Furthermore, it is the object of the present invention to propose a method with which the above-mentioned treatment is particularly easy.

In this arrangement it should be possible to operate the cable storage device with one of the above-cited known gripping devices.

This object is met by the invention with the use of a device according to claim 1. The measures according to the invention first result in an aid to placing cables into cable storage devices and in operation of said aid being particularly easy to handle.

Furthermore, in principle the gripping devices known from EP-A-0 494 570 and EP-A-0 584 493 can be used.

The solution provided by the present invention is convincing above all by its easy operation.

Further advantageous details of the invention are set out in the dependent claims.

The above-mentioned elements as well as the elements that are to be used according to the invention, which elements are claimed and described in the embodiments below, are not subject to any particular exceptional conditions in relation to their size, shape, use of materials and technical concept so that the selection criteria known in the respective field of application can be applied without any limitations.

Further details, characteristics and advantages of the subject of the invention are presented in the description, below, of the associated drawings which in an exemplary manner explain a device and an associated process sequence relating to the present invention.

Figure 2:
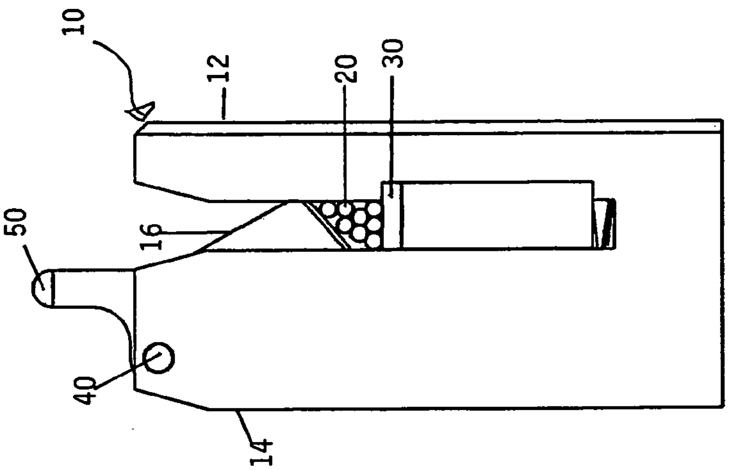
Figure 3:
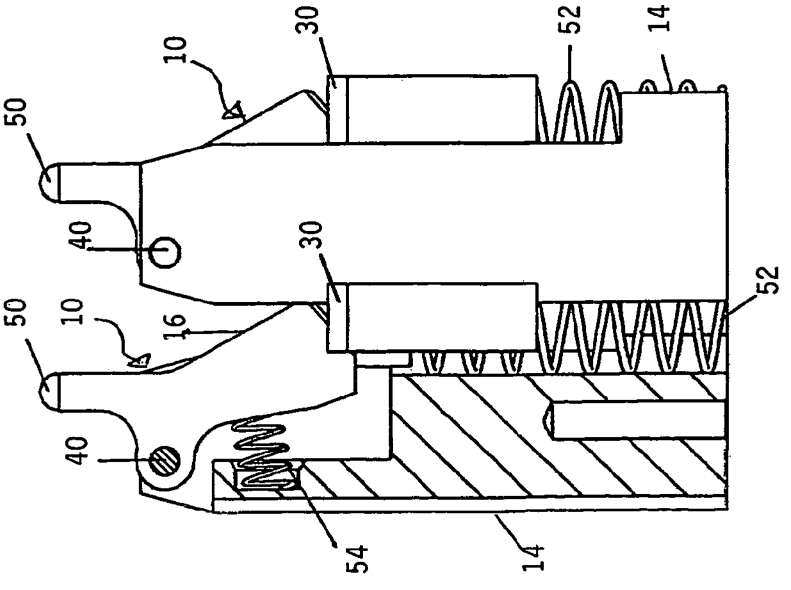
Figure 4:
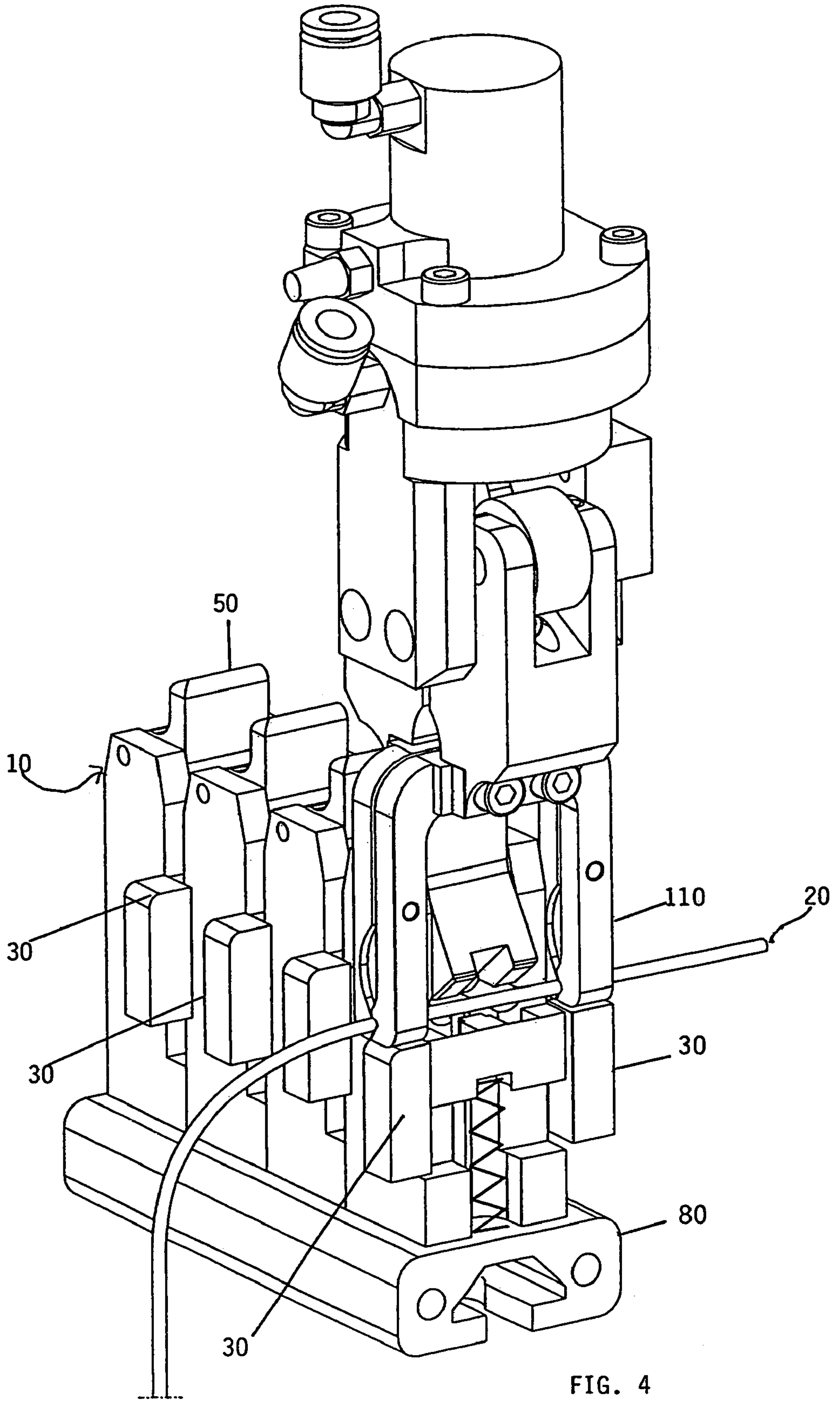
Figure 5:
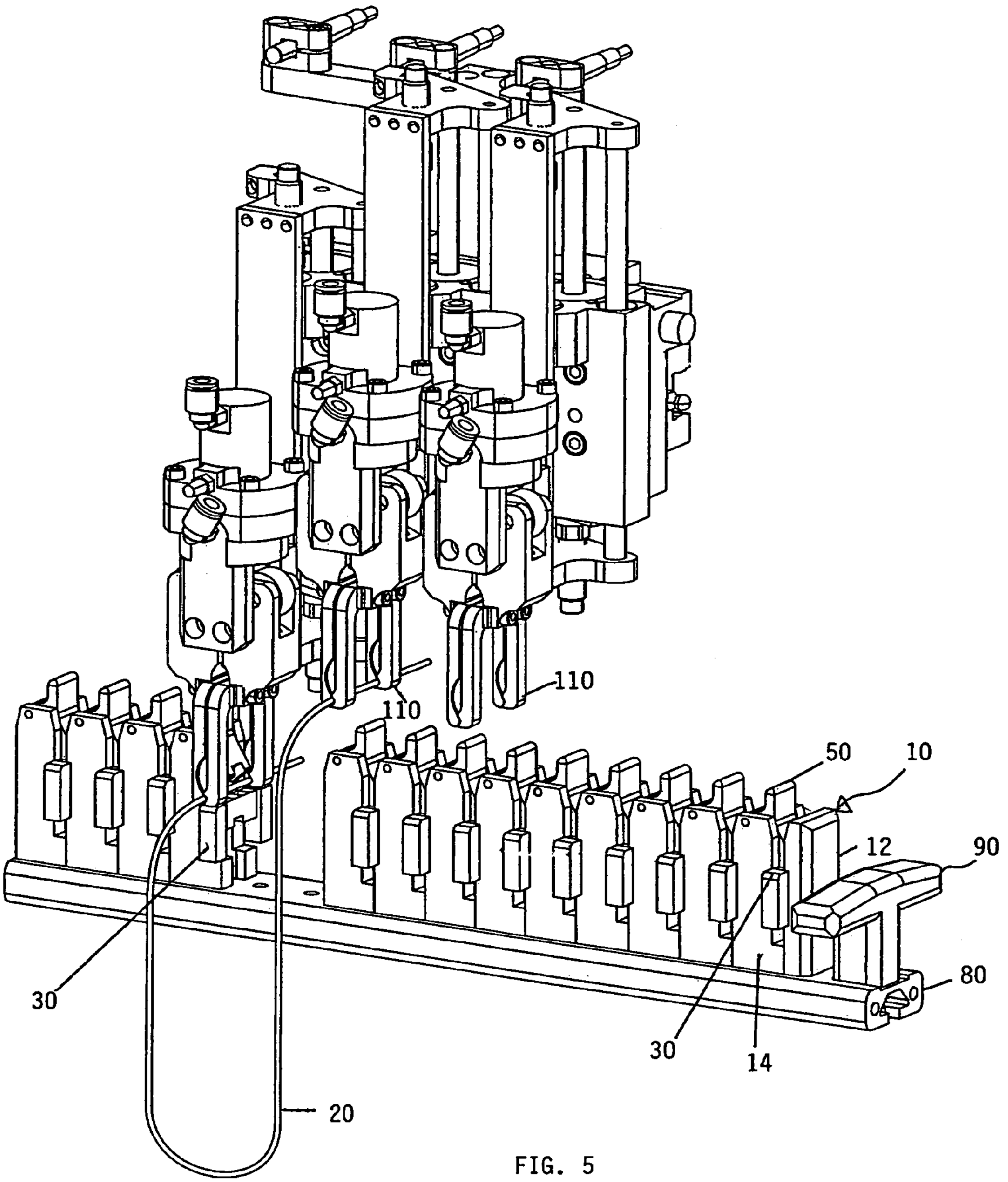
Figure 6:
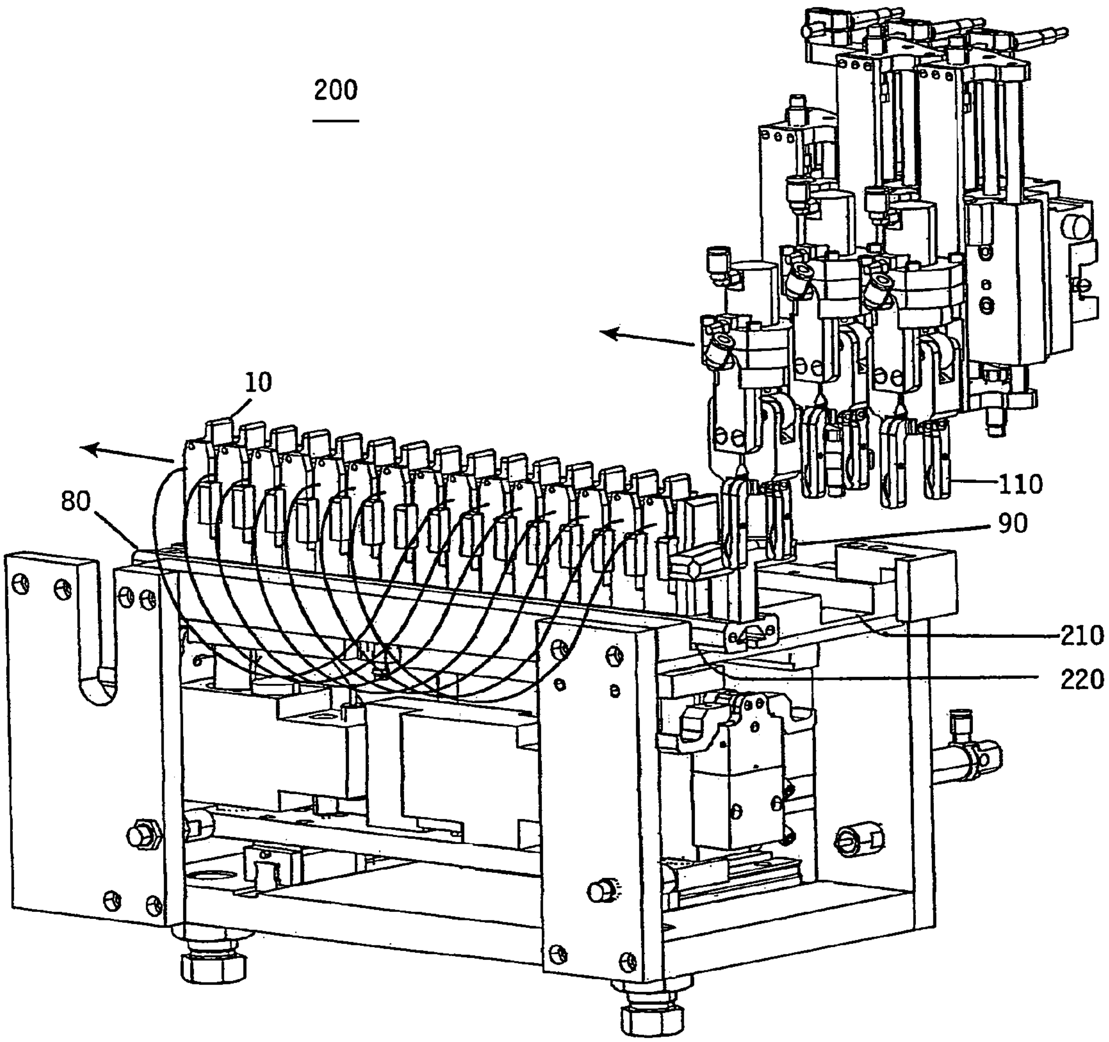
Figure 7:
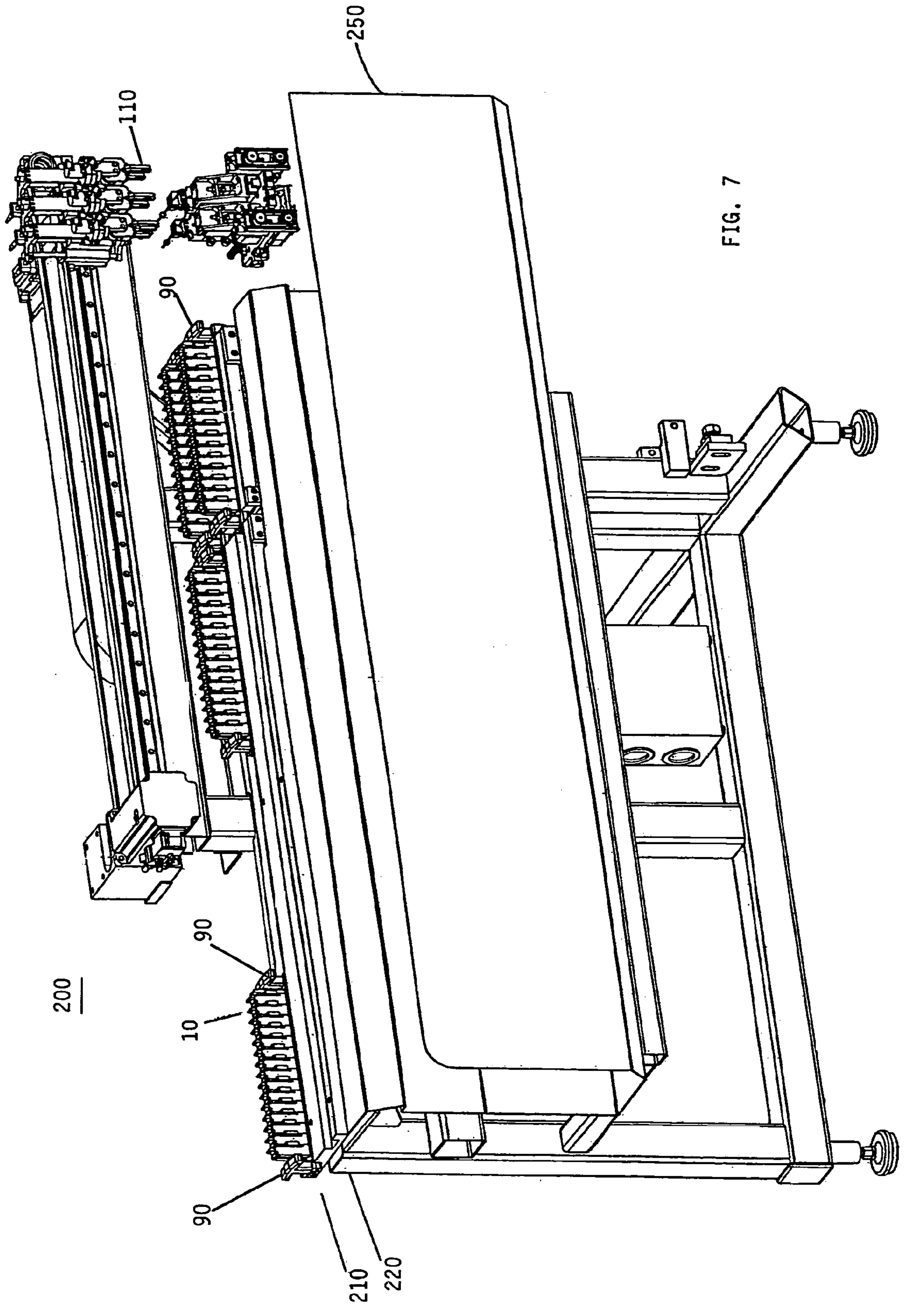

The following are shown in the drawings:

FIG. 1 a perspective view of a cable storage device for use in the device according to the present invention;

FIG. 2 a lateral view of the cable storage device according to FIG. 1;

FIG. 3 a lateral section view, as a functional drawing, of two cable storage devices according to FIG. 1, arranged side-by-side;

FIG. 4 a multitude of cable storage devices, arranged on a rail, with a gripping device for operating one of the storage devices;

FIG. 5 operation of a gripping device in conjunction with the cable storage devices on several rails;

FIG. 6 a facility according to the present invention for operating the cable storage devices according to FIG. 1 with the essential elements; and FIG. 7 the facility according to FIG. 6 with a cable trough.

The cable storage device which in FIGS. 1 and 2 overall is designated 10 comprises two interconnected lateral parts 12 and 14 which form a gap to accommodate one or a multitude of cables or cable ends 20. Towards the bottom the gap is delimited by a block 30. In this arrangement the block 30 substantially protrudes beyond the length of the lateral parts 12 and 14 and in this way forms a shoulder on both sides. Furthermore, the slide block 30 is designed so as to be vertically sprung; in the embodiment shown this is effected by a spring 52 by which the slide block is held.

Towards the top the gap for the cables can be closed or opened by means of a locking element 16. The locking element 16 is held on an axis 40 in the left lateral part 14 and is pushed against the internal wall of the right lateral part 12 by means of a further spring 54. However, by means of a lever 50 the locking element can be opened and the cables can be released in this way.

The average person skilled in the art will recognise that the position of the axis, or the fulcrum, can be significant as far as the force relationships and thus the load acting on the cable or cable end are concerned.

The upper inclined flank of the locking element 16 has a steep incline so as to keep the load to which the cable is subjected during insertion as light as possible. In contrast to this, in the present embodiment the bottom flank has an angle of approximately 45° so that, in conjunction with the spring force of the spring 54, the cable or cables is/are firmly held in the cable storage device.

FIG. 3 shows a preferred embodiment of the present invention in which the above-described cable storage elements are placed against each other. In this arrangement the right lateral part of the left storage element shown forms the left lateral part of the right storage element. If there is a multitude of interconnected storage elements, thus only the right terminating element is a lateral part 12.

In FIG. 4 the function of the present invention is shown in particular. Here, a multitude of storage elements 10 are arranged on a rail 80. In this figure the last right-hand lateral part 12 and a further element 14 are not in place so as to better show the function of the device. In this arrangement a gripper 110, which holds a cable 20, pushes down the shoulders of the block 30, thus freeing a larger storage space. The gripper 110 then releases the cable 20 by opening its gripping elements, and as a result of the block 30 being pushed back the storage space becomes as small again as required by the cable dimension. Of course, a cable or cable end can also be manually inserted in the cable storage device, e.g. in that the shoulder of the slide block is pushed down and the locking element 16, which is designed as a rocker, on the operating element 50 is opened.

This interrelationship is shown again in FIG. 5 at another scale, wherein a multitude of storage elements 10 are shown, which storage elements 10 comprise parts 14 and a terminating part 12. These storage elements are arranged on a rail 80. The rail 80 comprises a handle 90 at each end, which handle basically serves two functions. On the one hand this handle 90 is intended and implemented as a conventional carrying handle for the rails and thus for the multitude of storage elements; on the other hand the rail 80 is pushed out by means of the grippers 110 by the carrying handle.

However, as shown in FIG. 6, the rails 80, into which the individual cable storage devices 10 have been placed, are inserted on a placement facility 200 from the left in the rear row 210. In the present embodiment this is done manually. The rails 80 are then pushed to the right, provided there is room in that position for such a rail 80. If it is the turn of the right-hand rail 80 to receive cables or cable ends 20, this rail 80 is moved to the placement position in a front row 220—in the embodiment shown by being raised, shifted to the front, and lowered—and grippers 110 place cables into it. The embodiment shown provides for three grippers 110, arranged side-by-side, so that the grippers 110 can also supply cable ends with a double-crimp connection. Of course other arrangements of grippers (e.g. two grippers, or more than three grippers) are also possible. As shown in FIG. 7, in front of the front row 220, a cable trough 250 is provided so that the cable loops are protected when they are moved.

This embodiment provides for the cable storage devices on the rail 80 to be manually supplied when the cable storage devices have reached the left-hand position in the front row 220. Of course it is also possible to provide such supply by way of robot technology.

In the present embodiment the insertion of empty rails 80 and the removal of rails 80 comprising cables is provided approximately in the same horizontal position. This is advantageous both in case of manual supply and removal. In order to be able to benefit from part of this advantage, in the case of an offset position at least the same side should be provided for supply and removal.

In this embodiment the gripper 110 is provided for sliding the rails 80 in the front row 220. In this case sliding the rails 80 has no negative effect, or only a slight negative effect, on the cycle time because a transfer device places the empty rail forward to the front row 220, while the gripper carries out the process of ejecting the filled rail 80.

In principle it is, however, also possible for the sliding of the rails 80 in the front row and also in the rear row 220 to be carried out with the grippers 110 in that one of the grippers 110 engages one of the above-described handles 90 that are designed for this purpose and slides the rail 80 by this handle.

The invention claimed is:

1. A device for the storage of cables, in particular cable ends, comprising at least one storage rail comprising a multitude of cable storage devices;

a supply and transportation device for essentially horizontal supply and essentially horizontal transport of the storage rails to the position at which the storage of the cables or cable ends or the placement of cables or cable ends into the storage devices is intended, as well as for transport away from this position;

means for the storage or placement of each cable or cable end in a cable storage device, wherein the means for the storage or placement of each cable or cable end in a cable storage device are designed such that said means can lead away the filled cable storage devices after placement of the cables or cable ends essentially horizontally in relation to the position of placement.

2. The device according to claim 1, wherein on at least one side the storage rails comprise handles which can be engaged by the means for the storage or placement of the cables or cable ends during lead-away, so as to displace the storage rails.

3. The device according to claim 1, comprising a first supply groove or slot in which the storage rails can be supplied by horizontal displacement, and a second transport groove or slot in which the storage rails can be transported away by horizontal displacement.

4. The device according to claim 1, comprising a transfer device which is designed such that it can transfer the storage rails from one groove or slot to the other groove or slot.

5. The device according to claim 1, wherein the means for the storage or placement of the cables or cable ends are cable grippers, wherein each cable gripper is designed as a slide device.

6. A method for the storage of cables, in particular cable ends, in particular comprising a device according to claim 1, comprising the following steps:

the supply of storage rails comprising a multitude of cable storage devices in a row;

the supply of the storage rails, essentially horizontally, to a position in which the storage or placement of the cables or cable ends in the cable storage devices is intended;

the placement of cables to at least one of the cable storage devices using means for the storage or placement of the cables or cable ends in a cable storage device;

lead-away of the storage rails essentially horizontally to a position where they can be removed from the device, wherein the storage rails are led away using the means for the storage or placement of the cables or cable ends.

7. The method according to claim 6, characterised in that during the lead-away process the means for the storage or placement of the cables or cable ends engage handles of the storage rails and in this way displace the storage rails.

8. The method according to claim 6, characterised in that the storage rails in a first supply groove or slot are supplied by horizontal displacement, and in a second transport groove or slot are transported away by horizontal displacement.

9. The method according to claim 8, characterised in that by means of a transfer device which is designed such that it can transfer the storage rails from one groove or slot to the other groove or slot prior to cables being placed in them the storage rails are transferred from the first groove or slot to the second groove or slot.

* * * * *

UNITED STATES PATENT AND TRADEMARK OFFICE

CERTIFICATE OF CORRECTION

PATENT NO. : 7,570,863 B2
APPLICATION NO. : 11/262958
DATED : August 4, 2009
INVENTOR(S) : Noseda et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 946 days.

Signed and Sealed this

Seventh Day of September, 2010

David J. Kappos

*Director of the United States Patent and Trademark Office*